United States Patent
Sasage et al.

(10) Patent No.: US 6,656,408 B2
(45) Date of Patent: Dec. 2, 2003

(54) METHOD FOR EXTRUSION MOLDING AN EXTRUDABLE CEMENT-BASED OR GYPSUM-BASED HYDRAULIC COMPOSITION

(75) Inventors: Yoshiaki Sasage, Nakakubiki-gun (JP); Masaki Tabata, Nakakubiki-gun (JP); Tsutomu Yamakawa, Nakakubiki-gun (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/314,164

(22) Filed: Dec. 9, 2002

(65) Prior Publication Data

US 2003/0071392 A1 Apr. 17, 2003

Related U.S. Application Data

(62) Division of application No. 09/814,716, filed on Mar. 23, 2001.

(30) Foreign Application Priority Data

Mar. 27, 2000 (JP) ........................................ 2000-085519

(51) Int. Cl.⁷ ................................................. B28B 3/00
(52) U.S. Cl. ........................ 264/333; 264/464; 264/638
(58) Field of Search ................................. 264/333, 464, 264/638

(56) References Cited

U.S. PATENT DOCUMENTS

| | | |
|---|---|---|
| 3,847,630 A | 11/1974 | Compernass et al. |
| 3,960,584 A | 6/1976 | Savage |
| 4,000,093 A | 12/1976 | Nicol et al. |
| 4,174,305 A | 11/1979 | Burns et al. |
| 4,566,993 A | 1/1986 | Secemski et al. |
| 4,839,075 A | 6/1989 | Puchta et al. |
| 4,849,229 A | 7/1989 | Gaylord et al. |
| 5,047,086 A * | 9/1991 | Hayakawa et al. ......... 106/731 |
| 5,234,628 A | 8/1993 | Trabitzsch et al. |
| 5,456,850 A | 10/1995 | Trabitzsch et al. |

FOREIGN PATENT DOCUMENTS

| | | |
|---|---|---|
| DE | 1940654 | 2/1971 |
| DE | 2613790 | 10/1976 |
| JP | 63092700 | 4/1988 |
| JP | 2812837 B2 | 8/1998 |
| JP | 2884118 B2 | 2/1999 |
| PL | 158182 | 8/1992 |

* cited by examiner

*Primary Examiner*—Paul Marcnatoni
(74) *Attorney, Agent, or Firm*—Millen, White, Zelano & Branigan, P.C.

(57) ABSTRACT

A binder for hydraulic compositions comprises a water-soluble cellulose ether and a long-chain alkylbenzenesulfonic acid or a neutralization salt thereof. The presence of the long-chain alkylbenzenesulfonic acid compound as a binder component provides hydraulic compositions with a better plasticity at a lower water-soluble cellulose ether content than when the cellulose ether is used alone as the binder.

17 Claims, No Drawings

METHOD FOR EXTRUSION MOLDING AN EXTRUDABLE CEMENT-BASED OR GYPSUM-BASED HYDRAULIC COMPOSITION

This application is divisional of U.S. Ser. No. 09/814,716, filed Mar. 23, 2001.

BACKGROUND OF THE INVENTION

1. Field of the Invention

The present invention relates to binders for hydraulic compositions. The invention relates also to hydraulic compositions containing such binders.

2. Prior Art

Hydraulic compositions for extrusion molding often contain processing aids generally referred to as "binders." The binders have until now been composed entirely of cellulose ethers, including alkyl celluloses such as methyl cellulose, hydroxyalkyl celluloses such as hydroxyethyl cellulose, and hydroxyalkyl alkyl celluloses such as hydroxyethyl ethyl cellulose. Given their excellent plasticity and water retention, the use of such cellulose ethers as a binder in hydraulic compositions makes the compositions readily amenable to extrusion even in the absence of asbestos.

However, cellulose ethers are expensive because they are prepared by the chemical treatment of refined natural pulp as the starting material. Efforts have been made to mitigate such costs by replacing some of the cellulose ether with other, relatively inexpensive substances, including such thickening agents as polyvinyl alcohol, starch and various chemically synthesized products (e.g., polyacrylamide, polyethylene glycol), or a highly water-absorbing resin. For example, JP No. 2884118 discloses a method comprising the use of a water-soluble cellulose ether in combination with an acrylic copolymer to give an admixture for extruding asbestos-free cements. JP No. 2812837 describes a method involving the use of a thickener composed of a water-soluble cellulose ether in combination with polyvinyl alcohol.

However, such thickeners have thickening properties and water-retaining properties which are inferior to those of cellulose ethers. As a result, the amount of binder components used in the composition increases and moisture distribution within the extrudate becomes non-uniform, which tends to lower extrudate strength and cause swelling after autoclave curing. Hence, the use of prior-art thickeners such as the above often lowers the quality of the extruded product.

SUMMARY OF THE INVENTION

It is therefore an object of the invention to provide a binder for hydraulic compositions which, when used as an extrusion aid in cement- or gypsum-based hydraulic compositions, allows the content of water-soluble cellulose ether to be reduced while maintaining the extrudability and water retention properties of the composition. Another object of the invention is to provide hydraulic compositions containing such a binder.

We have found that the use of a long-chain alkylbenzenesulfonic acid or a neutralization salt thereof in combination with a water-soluble cellulose ether as the binder in a hydraulic composition allows the amount of water-soluble cellulose ether included in the composition to be reduced while at the same time providing excellent extrudability and water retention.

Accordingly, the invention provides a binder for hydraulic compositions which comprises a water-soluble cellulose ether and a long-chain alkylbenzenesulfonic acid or a neutralization salt thereof. Preferably, the long-chain alkyl group on the long-chain alkylbenzenesulfonic acid has 6 to 18 carbon atoms. The water-soluble cellulose ether is typically an alkyl cellulose, a hydroxyalkyl cellulose or a hydroxyalkyl alkyl cellulose. The invention also provides a hydraulic composition containing the foregoing binder.

DETAILED DESCRIPTION OF THE INVENTION

Preferred examples of the water-soluble cellulose ether used in the inventive binder for hydraulic compositions include alkyl celluloses, hydroxyalkyl celluloses and hydroxyalkyl alkyl celluloses. Specific examples include methyl cellulose, hydroxyethyl cellulose, hydroxypropyl methyl cellulose, hydroxyethyl methyl cellulose and hydroxyethyl ethyl cellulose. Preferably, the water-soluble cellulose ether has a viscosity, as measured for a 1 wt % aqueous solution at 20° C., of about 100 to about 50,000 mPa·s. From the standpoint of cost, the use of a water-soluble cellulose ether having a relatively high viscosity is advantageous. A viscosity of at least 5,000 mPa·s is especially preferred.

The long-chain alkylbenzenesulfonic acid or a neutralization salt thereof forms a complex with the water-soluble cellulose ether, exhibiting a very strong thickening effect. It thus acts together with the cellulose ether to increase the extrudability and water-retaining ability of the hydraulic composition. This synergistic effect makes it possible to maintain the necessary extrusion performance even at a lower water-soluble cellulose ether content. Moreover, these binder components have surface active effects which improve compatibility, particularly with organic fibers and powder components such as cement, thus increasing dispersibility during mixing and, in turn, making it possible to reduce the content of water-soluble cellulose ether in the composition.

The long-chain alkyl group on the alkylbenzenesulfonic acid may be linear or branched, and preferably has from 6 to 18 carbon atoms. Specific examples of suitable long-chain alkylbenzenesulfonic acid compounds include dodecylbenzenesulfonic acid, octylbenzenesulfonic acid, hexylbenzenesulfonic acid, heptylbenzenesulfonic acid, nonylbenzenesulfonic acid, decylbenzenesulfonic acid, tetradecylbenzenesulfonic acid, hexadecylbenzenesulfonic acid, octadecylbenzenesulfonic acid, and also sodium salts thereof as well as salts prepared by neutralizing the respective acids with triethanolamine.

The number of carbon atoms is more preferably from 8 to 16, and most preferably from 10 to 14. The industrial production costs for long-chain alkylbenzenesulfonic acids and neutralization salts thereof in which the alkyl group has 19 or more carbon atoms rise to such a degree that even lowering the content of cellulose ether in the composition may provide little if any cost-reducing effect. On the other hand, because alkylbenzenesulfonic acids and neutralization salts thereof in which the alkyl group has 5 or fewer carbon atoms have only a weak complex-forming effect with water-soluble cellulose ethers, a reduced water-soluble cellulose ether content tends to result in poor extrudability.

The water-soluble cellulose ether and the long-chain alkylbenzenesulfonic acid or neutralization salt thereof are formulated in a weight ratio of preferably 30/70 to 95/5, more preferably 50/50 to 90/10, and most preferably 65/35 to 85/15.

The incorporation of too much long-chain alkylbenzenesulfonic acid or a neutralization salt thereof excessively lowers the content of water-soluble cellulose ether, greatly diminishing the water-retaining properties inherent to water-soluble cellulose ethers. As a result, when pressure is applied to the hydraulic composition inside an extruder, water separates out, making extrusion difficult to carry out. On the other hand, the inclusion of too little long-chain alkylbenzenesulfonic acid or neutralization salt thereof provides only a weak thickening effect in concert with the water-soluble cellulose ether and permits only a slight reduction to be made in the cellulose ether content of the composition. As a result, the objects of the invention may be difficult to achieve.

The amount of the water-soluble cellulose ether and the long-chain alkylbenzenesulfonic acid or a neutralization salt thereof included in the extrudable hydraulic composition is generally in a range of 0.1 to 5 parts by weight per 100 parts by weight of the combined amount of the subsequently described hydraulic substances (e.g., cement, gypsum) and aggregates (reinforcing fibers) other than the above-described water-soluble cellulose ether, long-chain alkylbenzenesulfonic acid or neutralization salt thereof, and water making up the composition. From reasons having to do with cost, an amount within a range of 0.2 to 2 parts by weight is especially preferred. Given that these binder components are used in particular as extrusion aids, they should be used in a degree that provides the water retention and plasticity required for extrusion. The inclusion of too little binder may fail to provide the necessary water retention properties or result in poor plasticity, making extrusion difficult to carry out. Conversely, too much binder increases costs and raises the tack of the composition, which can make the extrusion pressure unnecessarily high.

Cements that may be used in the hydraulic compositions in which the inventive binder is formulated include ordinary Portland cement, slag cement, early-strength cement, fly-ash cement and alumina cement. Gypsum-based hydraulic substances that may be used include primarily the dihydrate and hemihydrate forms of gypsum. The content of cement or gypsum-based hydraulic substances may be set as needed to achieve the required strength.

If necessary, an aggregate may be included in the hydraulic compositions of the invention. For example, primary use may be made of powdered silica. To produce a more lightweight material, use can also be made of expanded perlite, highly water-absorbing resins, styrene beads, inorganic hollow microspheres and organic hollow microspheres. When ordinary aggregate is used, the amount of aggregate in the hydraulic composition is preferably 0 to 90 parts by weight, and especially 10 to 90 parts by weight, per 100 parts by weight of the combined amount of hydraulic substances and aggregate. When lightweight aggregate is used, the amount of aggregate is preferably 0 to 60 parts by weight, and especially 10 to 50 parts by weight.

If necessary, additives for the cement or gypsum, such as retarders, accelerators, high-performance water-reducing agents and high-performance AE water-reducing agents may be used. The amount of retarder or accelerator included may be selected based on the condition of the hydraulic composition after extrusion and before curing, although use is generally made of 0.1 to 10 parts by weight per 100 parts by weight of the hydraulic substance and aggregate combined. Other additives, such as high-performance water-reducing agents and AE water-reducing agents, may be included in an amount sufficient to maintain the fluidity of the system, and generally within a range of 0.05 to 6 parts by weight per 100 parts by weight of the hydraulic substance and aggregate combined.

If the hydraulic composition is to be extruded, it is advantageous to add also reinforcing fibers. Examples of suitable reinforcing fibers include those used for the same purpose in the prior art, such as cristobalite mineral fibers, wollastonite, sepiolite and mica, and also other types of fibers such as pulp fibers, polyvinyl alcohol fibers, polypropylene fibers and aramid fibers. The amount of reinforcing fiber incorporated into the hydraulic composition may vary depending on the desired flexural strength and impact strength, although use is generally made of 0.1 to 30 parts by weight per 100 parts by weight of the amount of hydraulic substance (cement, gypsum) and aggregate combined. Use in an amount below this range may fail to provide a sufficient reinforcing effect, whereas the use of too much reinforcing fiber results in poor dispersion of the fibers, which may bring about instead a decline in strength. Water may be added to the hydraulic composition. A conventional amount of water may be used, the particular amount of water being selected according to the type of hydraulic composition.

In addition, macromolecules which are used together with conventional water-soluble cellulose ethers may also be added. Illustrative examples include synthetic water-soluble polymers such as polyvinyl alcohol, polyethylene glycol and polyacrylamide, natural water-soluble polymers such as guar gum, and polysaccharides that are the products of microbial fermentation such as Welan gum.

EXAMPLES

Examples of the invention and comparative examples are provided to illustrate the invention, and are not intended to limit the scope thereof.

Examples and Comparative Examples

Cement-based extrudable compositions formulated as shown in Tables 1 and 2 below were prepared from the following materials.
(1) Ordinary Portland cement
(2) Sifted powdered silica
(3) Pulp having an average fiber length of 0.8 mm
(4) Water-soluble cellulose ether: Metolose SHV-P (hydroxypropyl methyl cellulose; viscosity of 1 wt % aqueous solution measured at 20° C., 13,800 mPa·s; manufactured by Shin-Etsu Chemical Co., Ltd.)
(5) Long-chain alkylbenzenesulfonic acid or salt:
  Sodium dodecylbenzenesulfonate (number of carbon atoms on side chain, 12; abbreviated below as "DBS")
  Octylbenzenesulfonic acid (number of carbon atoms on side chain, 8; abbreviated below as "OBS")
(6) Tap water The above materials other than water were mixed for 3 minutes in a Henschel mixer, the prescribed amount of water was added, and mixing was carried out for another 2 minutes. The mixture was worked 5 minutes in a 10-liter kneader-extruder, then extruded through a 6×75 mm die to form an extruded slab. The surface state of the slab was visually examined to determine whether the extrudate was free of cracking and the surface had been smoothly formed.

In each example, the kneaded composition prepared as described above was also extruded through a 20×40 mm die, following which it was subjected to an initial cure at 65° C. for 10 hours, then autoclave cured at 170° C. for 8 hours. The fully cured extrudate was tested for flexural strength and compressive strength in accordance with the measurement procedures described in JIS R-5201. The results are presented below in Tables 1 and 2.

TABLE 1

| Materials (pbw) | Example 1 | Example 2 | Example 3 | Example 4 |
|---|---|---|---|---|
| Cement | 70 | 70 | 70 | 70 |
| Powdered silica | 30 | 30 | 30 | 30 |
| Pulp | 4 | 4 | 4 | 4 |
| SHV-P | 1.4 | 1.4 | 1.2 | 1.2 |
| DBS | 0.3 | — | 0.3 | — |
| OBS | — | 0.3 | — | 0.6 |
| Water | 32 | 32 | 32 | 32 |
| Results | | | | |
| Surface state | Excellent | Excellent | Good | Good |
| Flexural strength (N/mm$^2$) | 13.8 | 12.9 | 12.6 | 13.1 |
| Compressive strength (N/mm$^2$) | 28.8 | 28.1 | 29.2 | 27.9 |

TABLE 2

| Materials (pbw) | Comparative Example 1 |
|---|---|
| Cement | 70 |
| Powdered silica | 30 |
| Pulp | 4 |
| SHV-P | 1.4 |
| Water | 32 |
| Results | |
| Surface state | Poor |
| Flexural strength (N/mm$^2$) | 11.4 |
| Compressive strength (N/mm$^2$) | 23.7 |

It is apparent from the above results that the use of a long-chain alkylbenzenesulfonic acid or a salt thereof together with a water-soluble cellulose ether as the binder provides an extrudate which has a better surface state than when the water-soluble cellulose ether is used alone as the binder, and which incurs no loss in any other properties.

Accordingly, the use of a binder for hydraulic compositions which is composed of both a water-soluble cellulose ether and a long-chain alkylbenzenesulfonic acid compound makes it possible to achieve good plasticity in the compositions at a lower water-soluble cellulose ether content than when the binder is composed entirely of cellulose ether.

Japanese Patent Application No. 2000-085519 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A method comprising extrusion molding a cement-containing or gypsum-containing extrudable hydraulic composition, which composition comprises:
    a cement or gypsum hydraulic substance,
    a reinforcing fiber, and
    a binder comprising a water-soluble cellulose ether and a long-chain alkylbenzenesulfonic acid or a neutralization salt thereof.

2. The method of claim 1, wherein the alkyl group of the long-chain alkylbenzenesulfonic acid has 6 to 18 carbon atoms.

3. The method of claim 1, wherein the water-soluble cellulose ether is an alkyl cellulose, hydroxyalkyl cellulose or hydroxyalkyl alkyl cellulose.

4. The method of claim 1, wherein the composition contains an aggregate in the amount of up to 90 parts by weight per 100 parts by weight of the combined amount of the hydraulic substance and aggregate.

5. The method of claim 4, wherein:
    the amount of the water-soluble cellulose ether and the long-chain alkylbenzenesulfonic acid or neutralization salt thereof is in the range of 0.1 to 5 parts by weight per 100 parts by weight of the combined amount of the hydraulic substance, reinforcing fiber, and aggregate in the composition,
    the water-soluble cellulose ether and the long-chain alkylbenzenesulfonic acid or neutralization salt thereof are in the composition in a weight ratio of 30:70 to 95:5, and
    the amount of the reinforcing fiber is 0.1 to 30 parts by weight per 100 parts by weight of the hydraulic substance and aggregate combined.

6. The method of claim 4, wherein the composition contains an aggregate in the amount of 10 to 90 parts by weight per 100 parts by weight of the combined amount of the hydraulic substance and aggregate.

7. The method of claim 6, wherein the aggregate is powdered silica.

8. The method of claim 1, wherein the water-soluble cellulose ether has a viscosity, measured for a 1 wt % aqueous solution at 20° C., of about 100 to about 500,000 mPa·s.

9. The method of claim 1, wherein the water-soluble cellulose ether has a viscosity, measured for a 1 wt % aqueous solution at 20° C., of 5,000 to about 500,000 mPa·s.

10. The method of claim 1, wherein the alkyl group of the long-chain alkylbenzenesulfonic acid has 10 to 14 carbon atoms.

11. The method of claim 1, wherein the water-soluble cellulose ether and the long-chain alkylbenzenesulfonic acid or neutralization salt thereof are provided in the composition in a weight ratio of 30/70 to 95/5.

12. The method of claim 1, wherein the water-soluble cellulose ether and the long-chain alkylbenzenesulfonic acid or neutralization salt thereof are in the composition in a weight ratio of 50/50 to 90/10.

13. The method of claim 1, wherein the water-soluble cellulose ether and the long-chain alkylbenzenesulfonic acid or neutralization salt thereof are provided in the composition in a combined amount of 0.1 to 5 parts by weight per 100 parts by weight of the other components of the composition.

14. The method of claim 1, wherein the water-soluble cellulose ether and the long-chain alkylbenzenesulfonic acid or neutralization salt thereof are provided in the composition in a combined amount of 0.2 to 2 parts by weight per 100 parts by weight of the other components of the composition.

15. The method of claim 1, wherein the cement or gypsum hydraulic substance is a Portland cement, slag cement, fly-ash cement, alumina cement, dihydrate gypsum and/or hemihydrate gypsum.

16. The method of claim 1, wherein the hydraulic substance is a cement and the composition is extruded to provide a cement slab.

17. The method of claim 1, wherein the cement or gypsum hydraulic substance is an early-strength cement.

* * * * *